United States Patent
Lin

(10) Patent No.: US 12,105,555 B2
(45) Date of Patent: Oct. 1, 2024

(54) ELECTRONIC APPARATUS

(71) Applicant: Lenovo (Beijing) Limited, Beijing (CN)

(72) Inventor: Bai Lin, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 358 days.

(21) Appl. No.: 17/550,293

(22) Filed: Dec. 14, 2021

(65) Prior Publication Data

US 2022/0308426 A1 Sep. 29, 2022

(30) Foreign Application Priority Data

Mar. 26, 2021 (CN) .......................... 202110325076.1

(51) Int. Cl.
| | |
|---|---|
| *G06F 1/16* | (2006.01) |
| *F16M 11/10* | (2006.01) |
| *G03B 17/56* | (2021.01) |
| *H04N 23/53* | (2023.01) |
| *F16M 11/18* | (2006.01) |
| *F16M 11/28* | (2006.01) |

(52) U.S. Cl.
CPC ......... *G06F 1/1607* (2013.01); *F16M 11/105* (2013.01); *G06F 1/1686* (2013.01); *F16M 11/18* (2013.01); *F16M 11/28* (2013.01); *G03B 17/561* (2013.01); *G06F 2200/1637* (2013.01); *H04N 23/531* (2023.01)

(58) Field of Classification Search
CPC ... G06F 1/1607; G06F 1/1686; F16M 11/105; H04N 23/531; G03B 17/561
See application file for complete search history.

(56) References Cited

U.S. PATENT DOCUMENTS

| | | | | |
|---|---|---|---|---|
| 7,813,118 | B2* | 10/2010 | Burge | H04R 1/026 361/825 |
| 9,625,793 | B1* | 4/2017 | Lai | G03B 17/561 |
| 10,659,697 | B2* | 5/2020 | Yang | H04N 23/51 |
| 11,140,249 | B2* | 10/2021 | Chen | H04M 1/0264 |
| 2017/0171528 | A1* | 6/2017 | Ent | G06F 1/1607 |
| 2018/0004256 | A1* | 1/2018 | Douglas | G06F 3/021 |
| 2020/0366851 | A1* | 11/2020 | Zhang | H04N 23/57 |
| 2023/0046711 | A1* | 2/2023 | Wallace | G06F 1/1605 |

FOREIGN PATENT DOCUMENTS

CN 111007962 A * 4/2020 ........... G06F 3/0412

* cited by examiner

*Primary Examiner* — Nidhi Thaker

(74) *Attorney, Agent, or Firm* — ANOVA LAW GROUP, PLLC

(57) ABSTRACT

An electronic apparatus includes a support bracket, a display assembly rotatably connected to the support bracket, a camera assembly separately arranged at an outside of the display assembly and located at the plane formed by the rotation of the display assembly, and a follower connected to the camera assembly and the support bracket. During rotation of the display assembly, the follower is configured to follow the rotation of the display assembly to synchronously drive the camera assembly to translate relative to the display assembly along an outer edge of the display assembly in a designated linear direction, so that a distance between the camera assembly and the outer edge of the display assembly is kept at a designated distance.

10 Claims, 4 Drawing Sheets

ELECTRONIC APPARATUS

CROSS-REFERENCE TO RELATED APPLICATION

This application claims priority to Chinese Patent Application No. 202110325076.1, filed on Mar. 26, 2021, the entire content of which is incorporated herein by reference.

TECHNICAL FIELD

The present disclosure generally relates to the electronic apparatus technical field and, more particularly, to an electronic apparatus.

BACKGROUND

For electronic apparatus with a camera and a display screen, the position of the camera relative to the display screen is fixed in the current technology. The camera is usually arranged at a top center of the display screen. In actual application, the display screen may be rotated around its center as needed. For example, if the display screen rotates by 90°, the camera may rotate along with the display screen, resulting in a change of an attitude of a camera body, which affects the use of the camera and user experience.

SUMMARY

Embodiments of the present disclosure provide an electronic apparatus. The electronic apparatus includes a support bracket, a display assembly rotatably connected to the support bracket, a camera assembly separately arranged at an outside of the display assembly and located at the plane formed by the rotation of the display assembly, and a follower connected to the camera assembly and the support bracket. During rotation of the display assembly, the follower is configured to follow the rotation of the display assembly to synchronously drive the camera assembly to translate relative to the display assembly along an outer edge of the display assembly in a designated linear direction, so that a distance between the camera assembly and the outer edge of the display assembly is kept at a designated distance.

Figure 1:
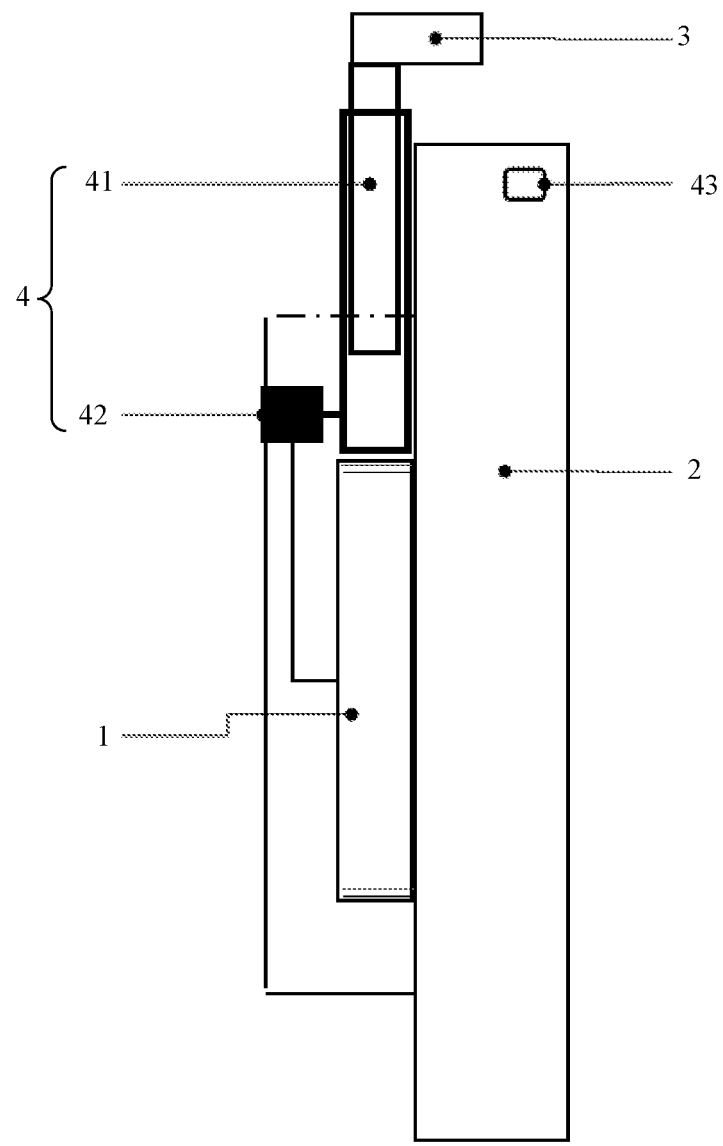
FIG. 1 illustrates a schematic structural diagram of an electronic apparatus according to some embodiments of the present disclosure.

DESCRIPTION OF REFERENCE NUMERALS 1, support bracket; 2, display assembly; 3, camera assembly; 4, telescopic mechanism; 41, telescopic member; 42, driver; 43, sensor; 411, driving screw; 412, position stop slot; 413, driven screw sleeve; 414, multi-stage telescopic sleeve; 415, rotation stop slot; 51, movable guide member; 52, fixed guide member; 53, position stop structure; 54, rolling member.

DETAILED DESCRIPTION OF THE EMBODIMENTS

Embodiments of the present disclosure provide an electronic apparatus, a camera assembly of the electronic apparatus may not be flipped with a rotation of a display assembly, thereby maintaining an original camera attitude.

The technical solutions and features of the present disclosure are described clearly according to the accompanying drawings. The described embodiments are only some embodiments not all the embodiments of the present disclosure. Based on the embodiments of the disclosure, all other embodiments obtained by those of ordinary skill in the art without any creative work are within the scope of the present disclosure.

Figure 3:
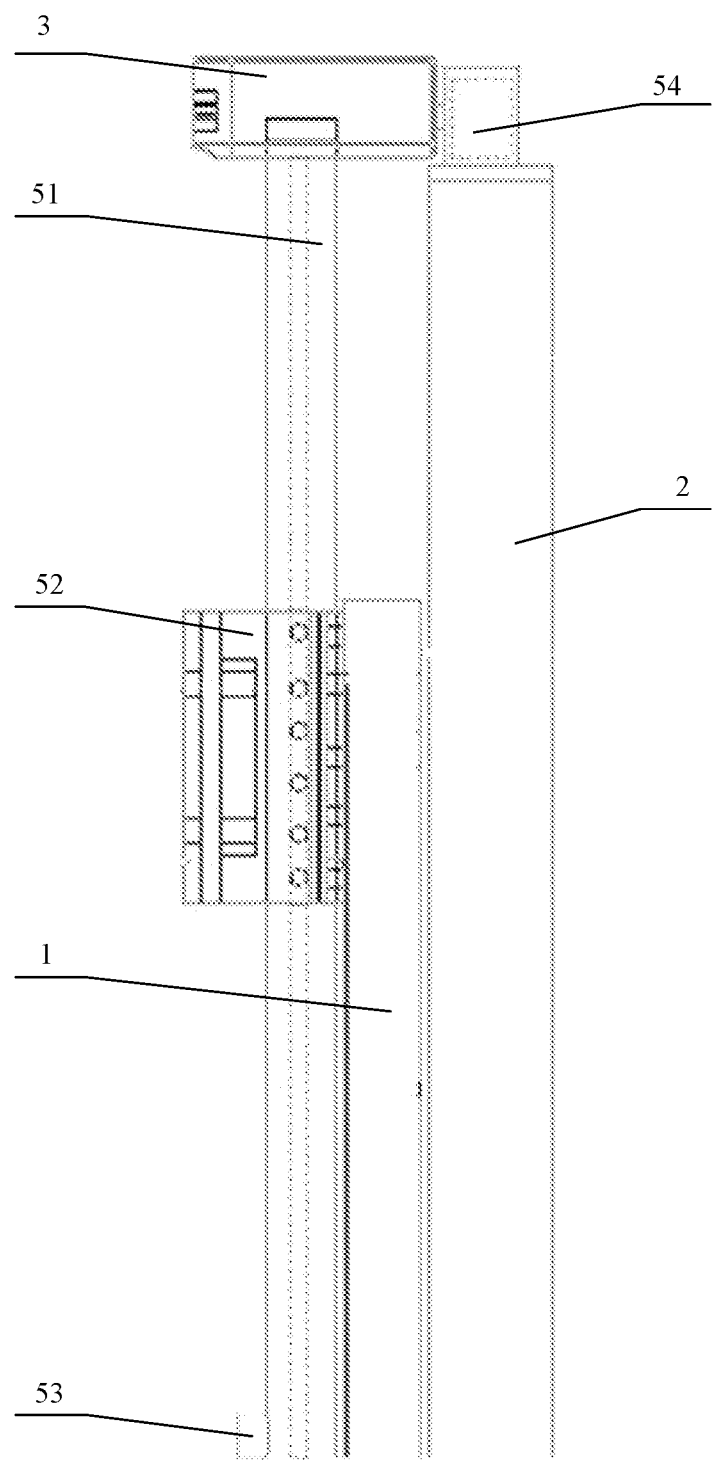
FIG. 3 illustrates a schematic structural diagram of another electronic apparatus according to some embodiments of the present disclosure.
Figure 4:
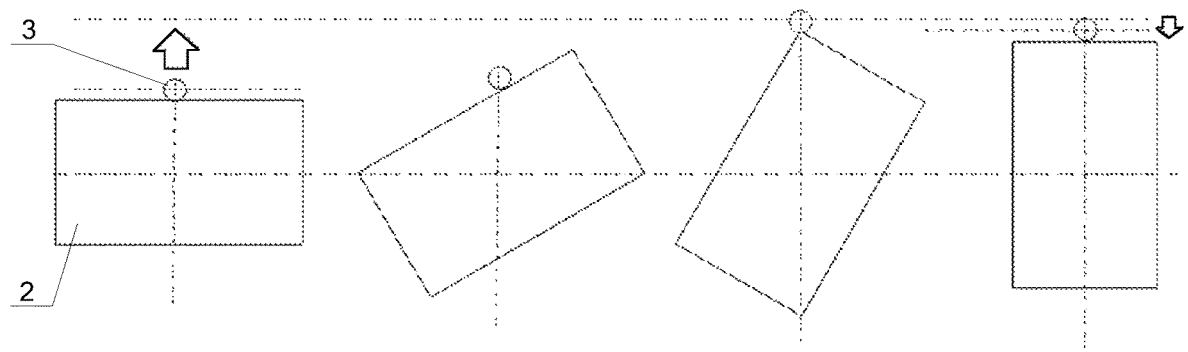
FIG. 4 illustrates a schematic diagram showing a working principle of the electronic apparatus according to some embodiments of the present disclosure.

As shown in FIG. 1, FIG. 3, and FIG. 4, embodiments of the present disclosure provide an electronic apparatus. The electronic apparatus includes a support bracket 1, a display assembly 2, a camera assembly 3, and a follower. In some embodiments, the support bracket 1 is fixedly arranged, the display assembly 2 is rotatably connected to the support bracket 1. The display assembly 2 may rotate in a plane where the display assembly 2 is located. The camera assembly 3 is separately arranged outside the display assembly 2 and is located at a rotation plane formed by rotation of the display assembly 2. The follower is connected to the camera assembly 3 and the support bracket 1. During rotation of the display assembly 2, the follower may synchronously drive the camera assembly 3 along an outer edge of the display assembly 2 to translate relative to the display assembly 2 in a designated linear direction along, as such, a distance between the camera assembly 3 and the outer edge of the display assembly 2 is kept at a designated distance.

When the display assembly 2 rotates relative to the support bracket 1, the follower synchronously drives the camera assembly 3 to translate along the outer edge of the display assembly 2 in a designated linear direction along with the rotation of the display assembly 2, which causes the camera assembly 3 to be always located outside the display assembly 2 and at a designated distance from the outer edge of the display assembly 2. As such, the camera assembly 3 does not interfere with the rotation of the display assembly 2, and the camera assembly 3 and display assembly 2 are kept in a compact arrangement. The translation of camera assembly 3 indicated that all points of the camera assembly 3 may move a same distance in the designated linear direction at the rotation plane. As such, the camera assembly 3 may not be flipped with the rotation of the display assembly 2 and maintain the original camera attitude.

The electronic apparatus may be an electronic whiteboard, and the display assembly 2 may include a display screen. The display screen may be directly written by hand or with an electronic pen. The display screen includes the function of a commercial handwriting tablet, and the written content may be saved and transmitted. The electronic whiteboard may also be configured as a multi-media device, which is configured for browsing, presentation, playback, remote communication, projection, touch screen operation, etc. on the display screen. The camera assembly may be configured for shooting, image collection, face recognition, etc. The whiteboard may be widely configured in offices, conferences, exhibitions, homes, and other occasions.

As shown in FIG. 1, embodiments of the present disclosure provide a follower, and the follower is a telescopic mechanism 4. The camera assembly 3 is arranged at a telescopic end of the telescopic mechanism 4. The telescopic mechanism 4 may adjust a telescopic state of the telescopic mechanism 4 along the designated linear direction according to current state information of the display assembly 2, as such, the telescopic end may always support the camera assembly 3 from the outer edge of the display assembly 2 at the designated distance.

During a working process, the display assembly 2 rotates relative to the support bracket 1, and the telescopic mechanism 4 may adjust its action according to the current state information of the display assembly 2 during the rotation. As such, the telescopic state of the telescopic end of the telescopic mechanism 4 in the designated linear direction is kept compatible with the current state of the display assembly 2, as such, the camera assembly 3 arranged at the telescopic end is kept away from the outer edge of the display assembly 2 by a certain distance, which is a designated distance. As such, the camera assembly 3 does not interfere with the rotation of the display assembly 2, and the camera assembly 3 and display assembly 2 are kept in a compact arrangement. Since the telescopic end of the telescopic mechanism 4 moves along the designated linear direction, the camera assembly 3 is driven to translate along the designated linear direction, so as to ensure the camera assembly 3 never be flipped with the rotation of the display assembly 2, thereby maintaining the original camera attitude.

In some embodiments, the current state information of the display assembly 2 includes an angle of a designated reference line of the display assembly 2 relative to a standard line at the current moment. The telescopic mechanism 4 may adjust the telescopic distance of the telescopic end along the designated straight line direction according to the above-described angle, as such, the telescopic end always supports the camera assembly 3 away from the outer edge of the display assembly 2 at the designated distance. In some embodiments, the designated reference line may be any straight line of the display assembly 2, where the designated reference line may rotate with the display assembly 2; while the standard line is an independent fixed straight line, which may be a horizontal straight line or a vertical straight line.

As the display assembly 2 rotates, the angle between the designated reference line of the display assembly 2 and the standard line changes, and the angle is an angle where the display assembly 2 is currently located. Since the current angle of the display assembly 2 is related to the current position of the edge of the display assembly 2, the camera assembly 3 needs to adjust the position according to the current position of the edge of the display assembly 2. Take an angle of a horizontal edge of the display assembly 2 relative to the horizontal straight line as an example. If the camera assembly 3 is located above the display assembly 2, when the angle between the horizontal edge of the display assembly 2 and the horizontal straight line changes from 0° to 90°, the edge point on the display assembly 2 dynamically corresponding to the camera assembly 3 and passing through the designated linear direction gradually ascends closer to the camera assembly 3 and then descends, as shown in FIG. 4. Therefore, the telescopic distance of the telescopic mechanism 4 needs to be adjusted, as such, the telescopic end of the telescopic mechanism 4 drives the camera assembly 3 to ascend in the designated linear direction and then descend, so as to keep the distance between the camera assembly 3 and the outer edge of the display assembly 2 at the designated distance.

In some embodiments, the telescopic mechanism 4 may automatically adjust the telescopic state of the telescopic mechanism 4 according to the angle at which the display assembly 2 is currently located, so as to drive the camera assembly 3 to automatically translate along the designated linear direction, such that the distance between the camera assembly 3 and the outer edge of the display assembly 2 is kept at the designated distance.

In some embodiments, the camera assembly 3 may also be arranged below, to the left or to the right of the display assembly 2, as long as the current angle of the display assembly 2 can be determined by the designated reference line and the standard line.

In some embodiments, the current state information of the display assembly 2 may further include a rotation speed of the display assembly 2 at the current moment. The telescopic mechanism 4 may adjust the telescopic distance and a telescopic speed of the telescopic end along the designated linear direction according to the angle and the rotation speed of the designated reference line of the display assembly 2 relative to the standard line at the current moment, so that the telescopic end always supports the camera assembly 3 away from the outer edge of the display assembly 2 by the designated distance.

Since the rotation speed of the display assembly 2 determines a change speed of the current angle of the display assembly 2, a change speed of the current position of an edge of the display assembly 2 is further determined by the rotation speed of the display assembly 2. The current position of the camera assembly 3 needs to be adjusted based on the current position of the edge of the display assembly 2. Therefore, the rotation speed of the display assembly 2 determines the telescopic speed of the telescopic mechanism 4. The faster the rotation speed of the display assembly 2, the faster the telescopic speed of the telescopic mechanism 4, so that the telescopic end of the telescopic mechanism 4 drives the camera assembly 3 to keep away from the outer edge of display assembly 2 at the designated distance.

As shown in FIG. 1, the telescopic mechanism 4 is optimized. The telescopic mechanism 4 includes a telescopic member 41, a driver 42, a controller, and a sensor 43. In some embodiments, one end of the telescopic member 41 is arranged and fixed at the support bracket 1, the other end of the telescopic member 41 is connected to the camera assembly 3, and is configured to hold the camera assembly 3 away from the outer edge of the display assembly 2 at a designated distance. The driver 42 is drivingly connected to the telescopic member 41 for driving the telescopic member 41 to expand and contract along the designated linear direction. The controller is controlledly connected to the driver 42 to control the action of the driver 42. The controller is arranged at the support bracket 1. The sensor 43 is arranged at the display assembly 2 to detect the current state information of the display assembly 2. The sensor 43 is connected to the controller, and the controller is configured to control the actuation of the driver 42 according to the current state information, so as to control the telescopic state of the telescopic member 41 along the designated linear direction, such that the telescopic part 41 always supports the camera assembly 3 away from the outer edge of the display assembly 2 at a designated distance.

In some embodiments, the current state information of the display assembly 2 detected by the sensor 43 may include the angle of the designated reference line of the display assembly 2 relative to the standard line and the rotation speed of the display assembly 2. The sensor 43 may be a gravity sensor. The gravity sensor may detect the current angle and the rotation speed of the display assembly 2 at the same time. The sensor 43 may further be two different sensors, such as an angle sensor and a speed sensor, which detect the current angle and the rotation speed of the display assembly 2, respectively.

Figure 2:
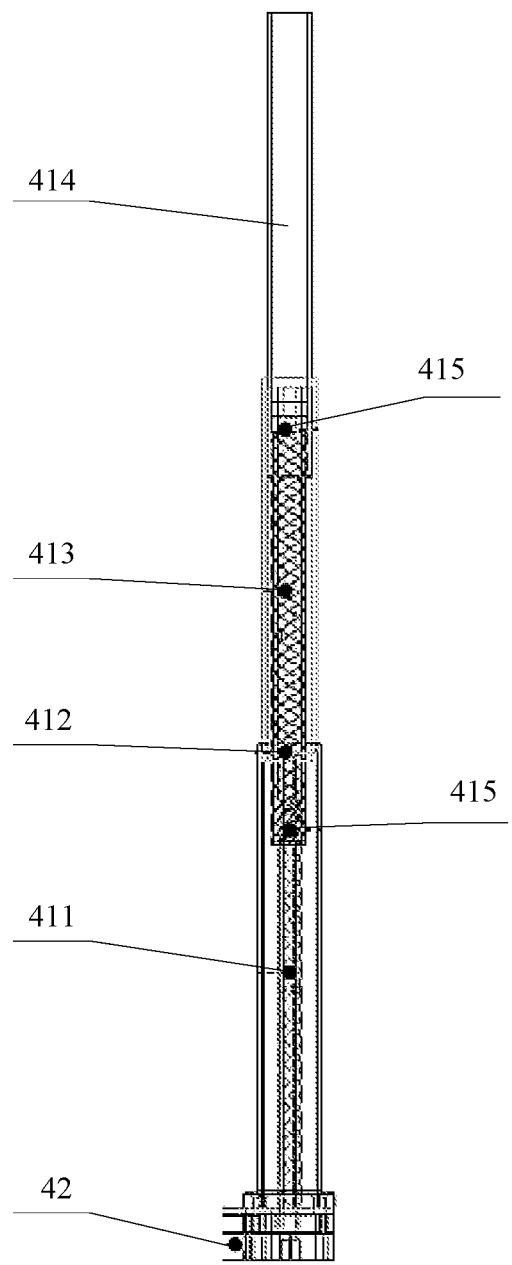
FIG. 2 illustrates a schematic structural diagram of a telescopic mechanism of an electronic apparatus according to some embodiments of the present disclosure.

As shown in FIG. 2, in some embodiments, the telescopic member 41 includes a driving screw 411, a driven screw sleeve 413, and a multi-stage telescopic sleeve 414. In some embodiments, the driving screw 411 is drivingly connected to the driver 42. For example, the driver 42 may include a driving motor set, and the driver 42 drives the driving screw 411 to rotate. The driven screw sleeve 413 is screw matched connected to the driving screw 411. The driven screw sleeve 413 is stationary in a circumferential direction, that is, the driven screw sleeve 413 cannot rotate, but only move axially. The driving screw 411 rotates, which drives the driven screw sleeve 413 to move axially along an axis of the driving screw 411. The multi-stage telescopic sleeve 414 has a plurality of coaxially sleeved and relatively axially movable sleeves. The driving screw 411 and the driven screw sleeve 413 are sleeved inside the multi-stage telescopic sleeve 414. A first stage telescopic sleeve 414 is fixed to the support bracket 1, and the final stage sleeve of the multi-stage telescopic sleeve 414 is connected to the driven screw sleeve 413. The camera assembly 3 is arranged at the final stage sleeve. When the driven screw sleeve 413 moves axially, the driven screw sleeve 413 drives the multiple sleeves of the multi-stage telescopic sleeve 414 to expand and contract stage by stage.

In some embodiments, a circumferential position limit structure may be arranged between the driven screw sleeve 413 and the multi-stage telescopic sleeve 414. Since the multi-stage telescopic sleeve 414 may not be rotated, the circumferential position limit structure is configured to limit the position of the driven screw sleeve 413 in the circumferential direction. In some embodiments, the circumferential position limit structure includes a rotation stop slot 415 arranged at an outer sidewall of the driven screw sleeve 413. A rotation stop protrusion is arranged at an inner wall of the multi-stage telescopic sleeve 414. The rotation stop slot 415 and the rotation stop protrusion may only move in a straight line. The multi-stage telescopic sleeve 414 may include two, three, or more sleeves, and the position stop slot 412 is arranged at the sleeve ends of the adjacent two-stage sleeves to limit the axial movement of the next-stage sleeves. When a lower-stage sleeve extends to the position stop slot 412, the lower-stage sleeve may not be able to extend, which prevents the lower-stage sleeve from coming out of the upper-stage sleeve.

When the telescopic member 41 is working, the driver 42 drives the driving screw 411 to rotate. The driving screw 411 drives the driven screw sleeve 413 to move along the axial direction. Since one end of the driven screw sleeve 413 is connected to the final stage sleeve of the multi-stage telescopic sleeve 414, the driven screw sleeve 413 drives the multi-stage telescopic sleeve 414 to expand and contract stage by stage. The camera assembly 3 connected to the final stage sleeve is driven to translate along the designated linear direction. The controller automatically controls an action of the driver 42 to realize the automatic translation of the camera assembly 3 and keep the distance from the outer edge of the display assembly 2 at the designated distance.

As shown in FIG. 3, embodiments of the present disclosure provides another follower. The follower includes a fixed guide member 52, a movable guide member 51, and a rolling member 54. The fixed guide member 52 is fixed to the support bracket 1. The movable guide member 51 is matched with the fixed guide member 52 for guiding movement, so that the movable guide member 51 moves relative to the fixed guide member 52 along a designated linear direction. The camera assembly 3 is arranged at the movable guide member 51. The rolling member 54 is rotatably connected to the camera assembly 3. The rolling member 54 may include a roller. The rolling member 54 is in rolling contact with the outer edge of the display assembly 2. As the display assembly 2 rotates, the rolling member 54 is pushed by the outer edge of the display assembly 2 to drive the camera assembly 3 to move along the designated linear direction relative to the fixed guide part 52 through the movable guide member 54. As such, the distance between the outer edge of the camera assembly 3 and the display assembly 2 is kept at the designated distance.

When the display assembly 2 rotates during the working process, the outer edge of the display assembly 2 may apply a driving force to the rolling member 54. A component force of the driving force in the designated linear direction drives the rolling member 54 to move along the designated linear direction, thereby driving the camera assembly 3 and the movable guide member 51 to move along the designated linear direction relative to the fixed guide member 52. A component force of the driving force along the outer edge of the display assembly 2 drives the rolling member 54 to roll on the outer edge of the display assembly 2 to reduce resistance. Since the distance between the rolling axis of the rolling component 54 and the outer edge of the display assembly 2 remains unchanged, the distance between the camera assembly 3 and the outer edge of the display assembly 2 is kept at the designated distance.

As shown in FIG. 4, take the camera assembly 3 located above the display assembly as an example. The display assembly 2 includes a rectangular shape. When an upper edge of the display assembly 2 is rotated from a horizontal position to a vertical position, the movable guide member 51 moves along the vertical direction relative to the fixed guide member 52. During the rotation of the display assembly 2, the outer edge of the display assembly 2 drives the rolling member 54 to move upward, which drives the camera assembly 3 to move upward. When the rolling member 54 rolls to a corner of the display assembly 2, the camera assembly 3 moves to a highest point. Then, as the display assembly 2 continues to rotate, the rolling member 54 moves downward along the outer edge of the display assembly 2 by the gravity of itself, the camera assembly 3, and the movable guide member 51. Then, the above movement process is repeated every 90° of rotation.

The camera assembly 3 may also be arranged below, to the left or the right of the display assembly 2. In some embodiments, an elastic reset member, such as a spring, may be arranged between the camera assembly 3 and the support bracket 1, so as to provide a restoring force for making the camera assembly 3 move close to the display assembly 2 along the designated linear direction, such that the rolling member 54 may always roll on the outer edge of the display assembly 2.

Further, in some embodiments, the fixed guide member 52 may be configured as a guide block, the guide block is fixed to the support bracket 1. A guide slot is arranged at the guide block, and the movable guide member 51 may be a guide rod. Balls are arranged between the guide block and the guide rod where they match. In some embodiments, the balls are arranged at the guide slot. The balls may reduce frictions between the guide block and the guide rod to make the camera assembly 3 move more smoothly.

Further, in some embodiments, a position stop structure 53 is arranged at a position of the guide rod away from the camera assembly 3. The position stop structure 53 may be blocked by the guide block, so as to prevent the guide rod from coming out of the guide block.

In some embodiments, the support bracket 1 includes a support member and a fixed cover. The fixed cover is fixed at the support member, and the display assembly 3 is rotatably connected to the fixed cover. The follower is arranged on the fixed cover. The electronic apparatus is fixed at a ground or a wall through the support member. When the follower is the telescopic mechanism 4, the controller of the telescopic mechanism 4, the telescopic member 41 are arranged at the fixed cover. When the follower is the movable guide member 51 and the fixed guide member 52, the fixed guide part 52 is fixed to the fixed cover.

Further, to facilitate the movement of the electronic apparatus, rollers are arranged at the support member of the support bracket 1, which is convenient and labor-saving for movement. The support member may be a tripod-type support member, a chevron support member, a rectangular frame support member, etc. As long as the fixed cover is installed at the support member and the display screen is supported by the support member, the support member is not limited to the structure listed in the embodiment.

Various embodiments of the present disclosure are described progressively, and each embodiment focuses on differences from other embodiments. The same or similar parts between the various embodiments may be referred to each other.

The description of the above-described embodiments enables those skilled in the art to implement or use the disclosure. Any person skilled in the art in the technical field disclosed in the present disclosure can easily think of various equivalent modifications to these embodiments. General principles defined herein may be implemented in other embodiments without departing from the spirit or scope of the present disclosure. Therefore, the scope of the present disclosure is not be limited by embodiments of the present disclosure, but should conform to the widest scope consistent with the principles and novel features disclosed in the present disclosure.

What is claimed is:

1. An electronic apparatus comprising:
    a support bracket;
    a display assembly rotatably connected to the support bracket and configured to rotate at a plane where the display assembly is located;
    a camera assembly separately arranged outside the display assembly and located at a rotation plane formed by rotation of the display assembly; and
    a follower connected to the camera assembly and the support bracket, and configured to, during rotation of the display assembly, follow the rotation of the display assembly to synchronously drive the camera assembly to translate relative to the display assembly along an outer edge of the display assembly in a designated linear direction, so that a distance between the camera assembly and the outer edge of the display assembly is kept at a designated distance;
    wherein:
        the follower includes a telescopic mechanism;
        the camera assembly is arranged at a telescopic end of the telescopic mechanism; and
        the telescopic mechanism is configured to adjust a telescopic state of the telescopic mechanism along the designated linear direction according to current state information of the display assembly, so that the telescopic end keeps the camera assembly away from the outer edge of the display assembly by the designated distance.

2. The electronic apparatus of claim 1, wherein:
    the current information of the display assembly includes an angle of a designated reference line of the display assembly relative to a standard line at a current moment; and
    the telescopic mechanism is configured to adjust a telescopic distance of the telescopic end along the designated linear direction according to the angle, so that the telescopic end keeps the camera assembly away from the outer edge of the display assembly by the designated distance.

3. The electronic apparatus of claim 2, wherein:
    the current information of the display assembly further includes a rotation speed of the display assembly at the current moment; and
    the telescopic mechanism is configured to adjust the telescopic distance and a telescopic speed of the telescopic end along the designated linear direction according to the angle and the rotation speed, respectively, so that the telescopic end keeps the camera assembly away from the outer edge of the display assembly by the designated distance.

4. The electronic apparatus of claim 1, wherein the telescopic mechanism includes:
    a telescopic member, one end of the telescopic member being arranged at the support bracket, and another end of the telescopic member being connected to the camera assembly and configured to keep the camera assembly away from the outer edge of the display assembly by the designated distance.

5. The electronic apparatus of claim 4, wherein the telescopic mechanism further includes:
    a driver connected to the telescopic member and configured to drive the telescopic member to expand and contract along the designated linear direction.

6. The electronic apparatus of claim 5, wherein the telescopic mechanism further includes:
    a controller connected to the driver and configured to control the driver according to the current state information to control expansion and contraction state of the telescopic member along the designated linear direction, so that the telescopic member keeps the camera assembly away from the outer edge of the display assembly by the designated distance.

7. The electronic apparatus of claim 6, wherein the telescopic mechanism further includes:
    a sensor arranged at the display assembly and coupled to the controller, the sensor being configured to detect the current state information of the display assembly.

8. The electronic apparatus of claim 5, wherein the telescopic member includes:
    a driving screw connected to the driver and configured to be driven to rotate by the driver; and
    a driven screw sleeve threadedly connected to the driving screw, the driven screw sleeve being stationary circumferentially and configured to move along an axis of the driving screw in response to rotation of the driving screw.

9. The electronic apparatus of claim 8, wherein:
    the telescopic member further includes a multi-stage telescopic sleeve including a plurality of coaxially sleeved and relatively axially movable sleeves;

the driving screw and the driven screw sleeve are sleeved inside the multi-stage telescopic sleeve;

a first stage sleeve of the multi-stage telescopic sleeve is fixed to the support bracket;

a last stage sleeve of the multi-stage telescopic sleeve is connected to the driven screw sleeve;

the camera assembly is arranged at the last stage sleeve; and the driven screw sleeve is configured to move axially to drive sleeves of the multi-stage telescopic sleeve to expand and contract stage by stage.

10. The electronic apparatus of claim 1, wherein:

the support bracket includes a support member and a fixed cover fixed at the support member;

the display assembly is rotatably connected to the fixed cover; and the follower is arranged at the fixed cover.

* * * * *